April 11, 1939.  H. T. CORY  2,154,377

MUD LARK

Filed July 14, 1938  2 Sheets-Sheet 1

Inventor
Harry Thomas Cory
per
Attorneys

Patented Apr. 11, 1939

2,154,377

UNITED STATES PATENT OFFICE 2,154,377

MUD LARK

Harry Thomas Cory, Washington, D. C.

Application July 14, 1938, Serial No. 219,190

3 Claims. (Cl. 180—9.1)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to tractors and is more particularly concerned with the provision of means for supporting tractors and other machinery on muddy surfaces ordinarily incapable of supporting such heavy bodies sufficiently to permit agricultural or other operations.

This invention is especially adapted for use in rice fields and the following description makes frequent reference to such an application. However, it is to be understood that this invention is not limited to rice fields in its application but may be used generally wherever it is desired to support heavy machinery, or other bodies, on muddy fields. For example, it may be used on other muddy agricultural fields, muddy battlefields, muddy river beds, flooded lands, etc.

The present general practice throughout the world, other than the United States, is to harvest rice by hand either before or just after drainage of the inundating water in which the rice is grown. In this way the moisture conditions of rice are not interfered with and little "lodging" (falling over) of the grain occurs. In many countries the rice so cut by sickles or cradles is carried by the reaper to the ridge of the rice patty and deposited on dry ground in the shade. Later the grain is separated from the stalks either by driving animals over them with the primitive thrasher floor; by stripping the grains by jerking the stalks through combs or hackles attached to vertical walls; by beating out with flails; or by the use of modern thrashing machinery.

In the United States, rice is generally harvested by some type of harvesting machinery used for other cereals, making it necessary for the water to be drained from the rice, and enough moisture removed from the ground to permit the use thereon of heavy machinery. It not infrequently happens that rains come along at just the right intervals to keep the ground surface too wet for the use of such machinery, and entire rice crops are thus completely lost. It is well-known that rice harvesting in the United states is usually subject to sharp weather hazards.

It is manifest, that any type of mowing or harvesting machine for use in the cutting of rice stalks cannot be used for harvesting rice while the irrigation waters still inundate the land, because of the great weight of the tractor. The problem then becomes one of supporting the heavy tractor machinery on ground which is, and has been continuously inundated for three or four months, consequently possessing very low supporting power.

My invention consists in supplanting the ordinary tractor wheels or caterpillar tractors by conveyor belting running on hollow water-tight cylinders rather than on cast iron wheels and cog wheels. In this way a certain buoyant effect is obtained from such hollow cylinders, which is helpful, but the important thing is, that the belting becomes substantially a rug descending over a large part or all of the ground surface underneath the tractor.

The following description, considered together with the accompanying drawings, will disclose this invention more fully, its construction and operation of parts, and further objects and advantages thereof will be apparent.

Figure 1:
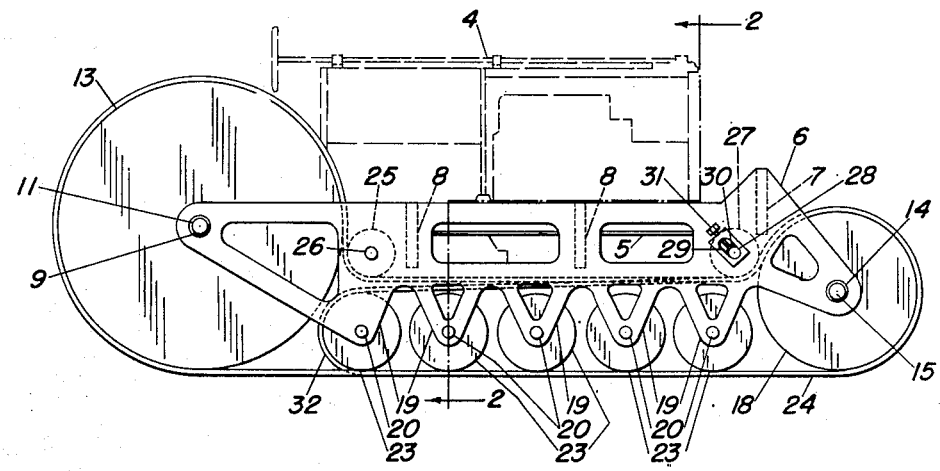
Figure 1 is a side elevational view of an ordinary tractor showing my invention mounted thereon.
Figure 2:
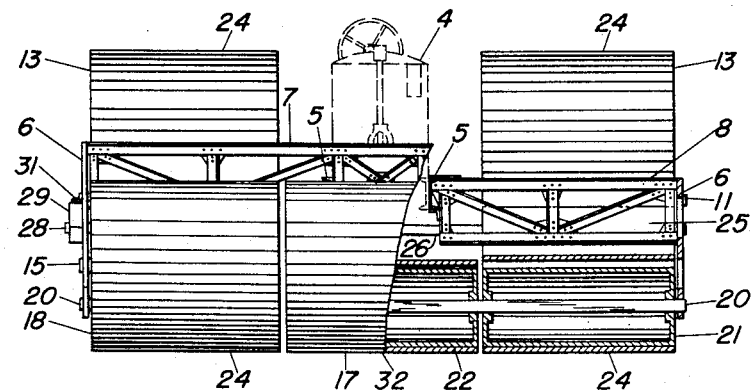
Figure 2 is a front elevational view, partly in section along the line 2—2 of Figure 1.
Figure 3:
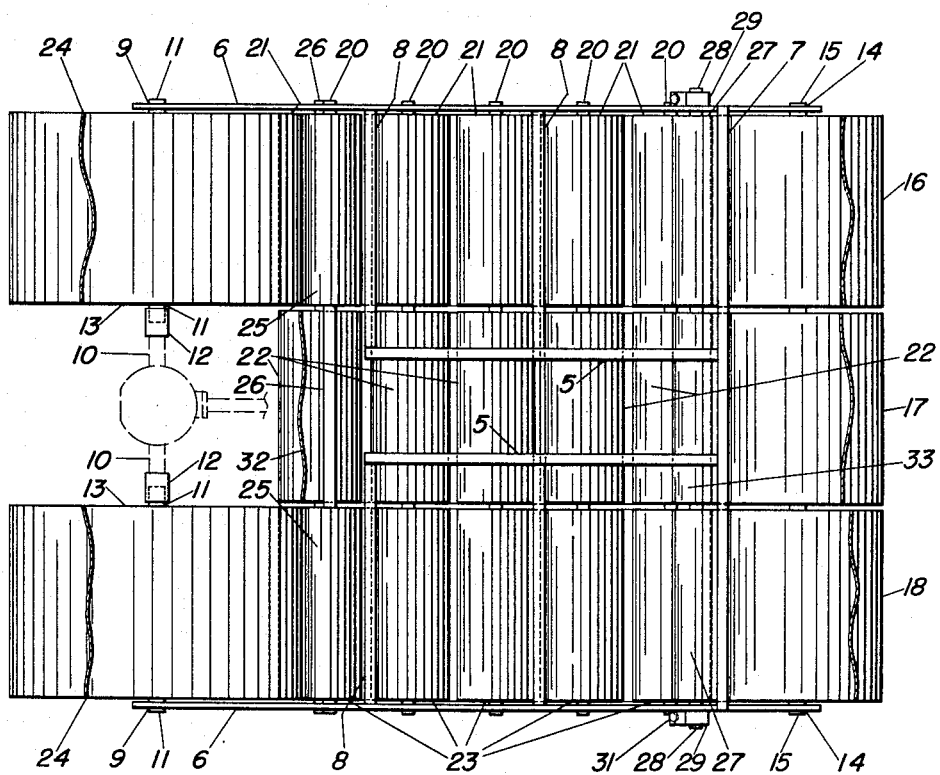
Figure 3 is a plan view with the power plant and supporting frame of the tractor removed and a part of the track belting cut away.

Referring with more particularity to the drawings, in which like numerals designate like parts, an ordinary farm tractor 4, with its front wheel assembly and two rear wheels removed, as provided with a track assembly consisting of two channels 5 5, secured to the sides of the frame of the tractor power plant, to which channels the longitudinal frame members 6 6 are attached by means of a front cross frame 7, disposed at a point forward of the tractor and two additional cross trusses 8 8, disposed beneath the power plant in juxtaposition to the lower framework of the power plant of the tractor. The rear ends of the members 6 6 extend backward, carrying bearings 9 9 at a point in line with the axles of the tractor. The normal axles 10 10 of the tractor carry extended shafts 11 11 by coupling means 12 12 and two hollow water-tight driving drums 13 13 are keyed to said extended shafts 11 11.

The front part of the frames 6 6 extend forward, carrying bearings 14 14 in which bearings the cross axle 15 is mounted. On said axle 15 three hollow water-tight drum wheels 16, 17, and 18 are rotatably mounted, substantially as shown, and each of said drum wheels rotates independently of the other.

Between the ends of each of said frame members 6 6, a plurality of downwardly extending brackets 19 are congruently disposed and carry bearings for cross axles 20, upon which the intermediate hollow, water-tight drum wheels 21, 22, and 23 are rotatably mounted.

Non-porous flexible belting material 24 is disposed around the driving drums 13 13 extending forward between the drum wheels 21 and 23, and the supporting cross trusses 8, thence around the front drum wheels 16 and 18, and thence beneath the intermediate drums 21 and 23, respectively, in circuity. In order to retain these belts 24 24 tightly and keep them below and out of contact with the cross trusses 8 8, rear idlers 25 25 are provided on the shaft 26, said shaft being rotatably mounted in bearings disposed at optimum points in the frames 6 6; and front idlers 27 27 are rotatably mounted on the shaft 28, said shaft being disposed in the diagonally slotted bearings 29 29 in the said frames 6 6. Said shaft 28 is adjustably disposed in said slots by any suitable means, such as the shoe 30 and the set screw 31.

The above belting arrangement constitutes the outer belt tracks. The central belt track 32 is passed around the front drum wheel 17, and extends back just above the central drums 22, around the rearmost of said central drums, returning beneath the tractor substantially the same as the outside belt tracks. A middle idler 33 is rotatably mounted on the shaft 28, together with the other idlers 27 27, and co-acts with them in shaft adjustments.

The rear drum wheels 13 13 take the place of the ordinary driving wheels on the tractor and through frictional engagement actuate the flexible belts 24, 24. All the other drum wheels in line with these driving wheels are actuated by the movement of the belts 24, 24. The central track, however, is not powered in any way and it is strictly idling at all times. Any movement of this central track is derived from its frictional engagement with the surface of the ground as the entire device moves.

Experiments show that when on any slimy ground surface submerged in water a weight is applied, such as a person's foot, the slimy material squashes out sideways and allows the weight to sink very deeply in the ground. If, on the other hand, a wide area is suddenly moved upon or rolled over the slimy mud surface, there is not time for such action to take place, and the wide surface compresses the greater part of the ground underneath. This vertical distance of such compression is very small and I have found that tractor belting tracks three to seven feet wide supporting up to 200 pounds per square foot of track surface, advancing through a field which has been under inundation for three or four months, creates ruts only about 2 inches deep. The reaction appears to be that there is not enough time for the slimy mud to squash out sideways and must perforce be compressed. However, there may be other and more satisfactory explanations of the principle underlying this phenomena and it is to be understood that this invention is not limited thereby.

In harvesting it is preferable that the wide tracks of the conveyor belting slightly overlap those made adjacently, so that the surface of the entire field after harvesting is both rutless and ridgeless. Using such a method of harvesting, all the rice stalks flatten down to the ground and the resulting ground surface is level. When it has dried out it is easily and simply disced into a very satisfactory seed-bed.

Such rug-like and conveyor belting tracks can be temporarily substituted for the wheels of small farm tractors or larger machines can be especially made for mud-lark purposes. The rice farmer would only need put an interchangeable track to his farm tractor for use in sowing rice in water rather than by airplane as it is now fairly common, especially in California during the rice harvesting season. At all other times the regular equipment of wheels or tractor tracks would be used on the tractor.

Having thus described my invention, I claim:

1. In combination with a tractor having a power plant, continuous belting tracks disposed on the opposite sides of the tractor, constituting outer tracks in substitution of the ordinary wheels of the tractor, said tracks being actuatable by the power plant of the tractor, and a continuous central belting track mounted independently of said first-mentioned tracks, and substantially coextensive with the space therebetween.

2. In combination with a tractor having a power plant, continuous belting tracks disposed on a plurality of hollow water-tight drums on the opposite sides of the tractor in substitution of the ordinary wheels of the tractor, said tracks being actuatable by the power plant of the tractor, and a continuous central track beneath the tractor disposed on a plurality of hollow water-tight idling drums, said central truck being substantially coextensive with the space between said first-mentioned tracks.

3. In combination with a tractor chassis having a power plant, a frame secured to each side of the chassis, each frame carrying a set of longitudinally disposed hollow water-tight drums, one drum in each set being a driving drum motivatable by said power plant, an additional set of hollow water-tight idling drums beneath the tractor between and independent of said first-mentioned sets of drums, and a belting track around each set of drums, the belting track around said idling drums being substantially coextensive with the space between the other tracks.

HARRY THOMAS CORY.

CERTIFICATE OF CORRECTION.

Patent No. 2,154,377. April 11, 1939.

HARRY THOMAS CORY.

It is hereby certified that error appears in the printed specification of the above numbered patent requiring correction as follows: Page 1, second column, line 34, for the word "as" read is; page 2, second column, line 46, claim 2, for "truck" read track; and that the said Letters Patent should be read with this correction therein that the same may conform to the record of the case in the Patent Office.

Signed and sealed this 6th day of June, A. D. 1939.

Henry Van Arsdale (Seal) Acting Commissioner of Patents.